United States Patent [19]

Arnold

[11] Patent Number: 5,337,266
[45] Date of Patent: Aug. 9, 1994

[54] METHOD AND APPARATUS FOR FAST LOGARITHMIC ADDITION AND SUBTRACTION

[76] Inventor: Mark G. Arnold, 1400 Grand Ave., Laramie, Wyo. 82070

[21] Appl. No.: 512,574

[22] Filed: Apr. 10, 1990

Related U.S. Application Data

[63] Continuation of Ser. No. 320,867, Mar. 7, 1989, abandoned, which is a continuation-in-part of Ser. No. 135,676, Dec. 21, 1987, abandoned.

[51] Int. Cl.⁵ .................. G06F 7/00; G06F 15/00
[52] U.S. Cl. .................................. 364/748.5
[58] Field of Search .................. 364/748.5, 768

[56] References Cited

U.S. PATENT DOCUMENTS

| | | | |
|---|---|---|---|
| 3,402,285 | 9/1968 | Wang | 364/748.5 |
| 3,436,533 | 4/1969 | Moore et al. | 364/748.5 |
| 3,631,230 | 12/1971 | Chen | 364/748.5 |
| 4,290,111 | 9/1981 | Dillon | 364/768 |
| 4,531,124 | 7/1985 | Lassallette et al. | 364/748.5 |
| 4,583,180 | 4/1986 | Kinetz | 364/748.5 |
| 4,682,302 | 7/1987 | Williams | 364/748.5 |
| 4,720,809 | 1/1988 | Taylor | 364/748 |
| 4,727,508 | 2/1988 | Williams | 364/748.5 |
| 4,734,875 | 3/1988 | Florence et al. | 364/748.5 |
| 4,737,925 | 4/1988 | Williams | 364/748.5 |
| 4,852,038 | 7/1989 | Wagner et al. | 364/748.5 |

FOREIGN PATENT DOCUMENTS 5572252  5/1980  Japan .................. 364/768

OTHER PUBLICATIONS

Barciss et al., "Basics of the CRD Computer", Northwestern Univ. ERDA Report C00-2280-25, Aug. 1977.
Henkel, "Improved Addition for Logarithmic Number Systems", IEEE Trans. on Acoustics, Speech, and Signal Processing, vol. ASSP-37, pp. 301-303, Feb. 1989.
Stouraitis, "Logarithmic Number System Theory Analysis and Design", Ph.D. Dissertation, Univ. of Fla., Gainesville, 1986.
Lang et al., "Integrated-Circuit Logarithmic Units", IEEE Trans. on Computers, vol. C-34, #5, pp. 475-483, May 1985.
Kingsberry et al., "Digital Filter Using Logarithmic Arithmetic", Electronics Letters, vol. 7, #2, pp. 56-58, Jan. 28, 1971.
Taylor et al., "A 20 Bit Logarithmic Number System Processor", IEEE Trans. on Computers, vol. 37, #2, pp. 190-199, Feb. 1988.
Barlow et al., "On Roundoff Error Distributions in Floating Point and Logarithmetic Arithmetic", Computing, vol. 34, pp. 325-347, 1985.

(List continued on next page.)

Primary Examiner—Dale M. Shaw
Attorney, Agent, or Firm—William E. Hein

[57] ABSTRACT

An apparatus is provided for logarithmic subtraction that is suitable for general purpose computing using the sign logarithm number system. In the sign logarithm number system, a sign bit is concatenated to a fixed point approximation of the logarithm of the absolute value of the real number being represented. Multiplication and division are easy and fast because the only steps required are to add or subtract the logarithms and exclusive OR the sign bits. In the prior art, logarithmic arithmetic has been restricted to limited precision applications (8-16 bits), such as digital filtering, because of the problem of accurate, high speed subtraction. The present invention provides a new circuit for subtracting two numbers represented in logarithmic form which makes design of arithmetic units for larger word sizes (32 bits) practical. The subtraction circuit approximates $\log_b |1 - b^z|$, where z is the difference of the logarithms being subtracted. The value of z is shifted, and the high part of z is used as input to two ROMs. The output of the first ROM is added to the product of the second ROM and the low part of the shifted z value. In the case of z being close to zero, the low part of z is used as input to a third ROM, which provides a more accurate approximation of $\log_b |1 - b^z|$.

3 Claims, 5 Drawing Sheets

OTHER PUBLICATIONS

Taylor, "An Extended Precision Logarithmic Number System", *IEEE Trans. on Acoustics, Speech and Signal Processing*, vol. ASSP-31, #1, pp. 232-234, Feb. 1983.

Arnold, "Extending the Precision of the Sign Logarithmic Number System", M.S. Thesis, Univ. of Wyoming, Jul. 1982.

Arnold et al., "Extended Precision for Logarithmic Addition in DSP Applications", Proc. of 1988 IEEE International Conf. on Acoustics, Speech, and Signal Processing, Apr. 1988.

Andoyer, "Tables Fondamentales pour les Logarithmes d'Addition et de Soustraction", Bulletin Astronomique, vol. 2, No. 2, p. 8, 1922.

Arnold et al., "Redundant Logarithmic Number Systems", Proceedings of the Ninth Symposium on Computer Arithmetic, pp. 144-151, 1989.

Bechtolsheim et al., "The Implementation of Addition in Logarithmic Arithmetic", Computer Systems Laboratory, Stanford University, Mar. 1980.

Gundelfinger, "Zur Berechnung der Gausschen Logarithmen fur Kliene Werthe von B resp. zugehorige Werthe von A.", Journal fur die reine und angewandte Mathematik, Band 124, p. 90, 1902 (English language translation included).

Gundelfinger, Sechsstellige Gaussische und Siebenstellige Gemeine Logarithmen, Verlag Von Veit & Comp., 1902 (English language translation included).

Lewis et al., "Algorithm Design for a 30-bit Integrated Logarithmic Processor", Proceedings of the Ninth Symposium on Computer Arithmetic, pp. 192-199, 1989.

Nell, Zeitschrift fur Vermessungswesen, vol. 20, pp. 442-446, 1891 (English language translation included).

Sherman et al., "A Six-Place Table of the Einstein Functions", The Journal of Physical Chemistry, vol. 46, p. 644, 1942.

METHOD AND APPARATUS FOR FAST LOGARITHMIC ADDITION AND SUBTRACTION

CROSS REFERENCE TO RELATED APPLICATIONS

This application is a continuation of application Ser. No. 07/320,867, filed on Mar. 7, 1989, now abandoned, which is, in turn, a continuation-in-part of application Ser. No. 07/135,676, filed on Dec. 21, 1987, now abandoned.

FIELD OF THE INVENTION

This invention relates to computer arithmetic, and more particularly, to a means for computing the difference of numbers represented using the sign logarithm number system.

BACKGROUND AND SUMMARY OF THE INVENTION

Computations performed on real numbers in science and engineering typically require numbers whose magnitudes may vary greatly. The typical prior art solution for representing such numbers is to use a floating point number system, such as the IEEE 754 standard. One disadvantage of prior art floating point processors is that they require expensive circuits with high power consumption to achieve high speed operation. Another disadvantage of floating point is that all four basic arithmetic operations (addition, subtraction, multiplication, and division) can produce roundoff errors, as described by Barlow and Bareiss in "On Roundoff Distributions in Floating Point and Logarithmic Arithmetic", Computing, vol. 34, pp. 325-347, 1985. To overcome the speed, cost and accuracy disadvantages of floating point, the use of logarithmic number systems for limited precision computers has been suggested in the prior art, as typified by U.S. Pat. No. 4,531,124. Multiplication and division of numbers represented in logarithmic form is inexpensive and accurate, since the logarithm of a product is the sum of the logarithms of the numbers being multiplied, and the logarithm of a quotient is the difference of the logarithms of the numbers being divided.

The more challenging aspect of logarithmic arithmetic is the computation of the sum and differences of the numbers being represented as logarithms. First implemented by Kingsbury and Rayner, "Digital Filtering Using Logarithmic Arithmetic", Electronics Letters, Vol 7, pp. 56-58, 1971, addition and subtraction can be implemented by adding a correction term to the smaller of the two logarithms. Since $$\log_b(|X| + |Y|) = \log_b(|X|(1 + |Y|/|X|))$$
$$= \log_b(|X|) + s_b(\log_b(|Y|) - \log_b(|X|))$$

where
$$s_b(z) = \log_b(1 + b^z)$$

addition in the sign logarithm number system requires three hardware units: a fixed point subtractor that produces the difference of the logarithms, an approximation unit that computes $s_b$, and a fixed point adder. Also $$\log_b ||X| - |Y|| = \log_b(|X|(1 - |Y|/|X|))$$
$$= \log_b(|X|) + d_b(\log_b(|Y|) - \log_b(|X|))$$

where $$d_b(z) = \log_b|1 - b^z| = \begin{array}{l} \log_b(b^z - 1) = s_b^{-1}(z), \quad z > 0 \\ \log_b(1 - b^z), \quad z < 0 \end{array}$$

and so, provided that the approximation unit can be selected to produce either $s_b$ or $d_b$, the same hardware can be used for both addition or subtraction. By including a sign bit with every word, the sign logarithm number system makes it possible for simple logic to select whether $s_b$ or $d_b$ need be computed. (Such logic is similar to that used for addition and subtraction of signed magnitude numbers.)

The central aspect of logarithmetic arithmetic is the computation of $s_b$ and $d_b$. When the application only demands limited precision, tabular methods, typically implemented with ROMs or PLAs, can be used to approximate $s_b$ and $d_b$. For example, see Lang et al, "Integrated Circuit Logarithmic Arithmetic Units", IEEE Transactions on Computers, Vol C-34, pp 475-483, 1985. However, if the application requires a word size of more than 8 to 16 bits, simple ROM or PLA implementations are not suitable because the circuit complexity grows exponentially as the number of bits in the word increases. A floating point word size of 32 bits is regarded as the smallest acceptable size for real arithmetic on a general purpose computer, where the nature of the computation is not known when the hardware is designed. The prior art ROM and PLA implementations of $s_b$ and $d_b$ are not suitable for a general purpose computer.

To overcome the restrictions of the prior art, linear interpolation of $s_b$ has been suggested in Arnold, "Extending the Precision of the Sign Logarithm Number System," M. S. Thesis, University of Wyoming, 1982. Using current technology, such interpolation provides sufficient accuracy for 32 bit logarithmic addition. However, the apparatus described therein is not suitable for approximating $d_b(z)$, because as $z$ approaches zero the errors introduced by linear approximation increase. Other than the expensive and slow process of separately computing the logarithm and antilogarithm in $\log_b|1-b^z|$ by methods typified by U.S. Pat. Nos. 4,583,180, 3,631,230 and 3,402,285, there is no practical, high speed, prior art method for approximating $d_b$ that is accurate enough for 32 bit logarithmic subtraction.

Accordingly, it is an object of the present invention to compute differences of numbers represented in logarithmic form with accuracy suitable for general purpose computation.

Another object of the present invention is to reduce the memory required to achieve the desired precision.

Yet another object of the present invention is to allow computation of $\log_b(1+b^z)$ by selectively bypassing portions of the hardware used for computing $\log_b|1-b^z|$.

Still another object of the present invention is to allow computation of $\log_b|1-b^z|$ for values of $z$ near zero with the required accuracy for 32 bit operation by transforming the problem into one of computing $\log_b(1+b^z)$.

PREFERRED EMBODIMENT

Figure 1:
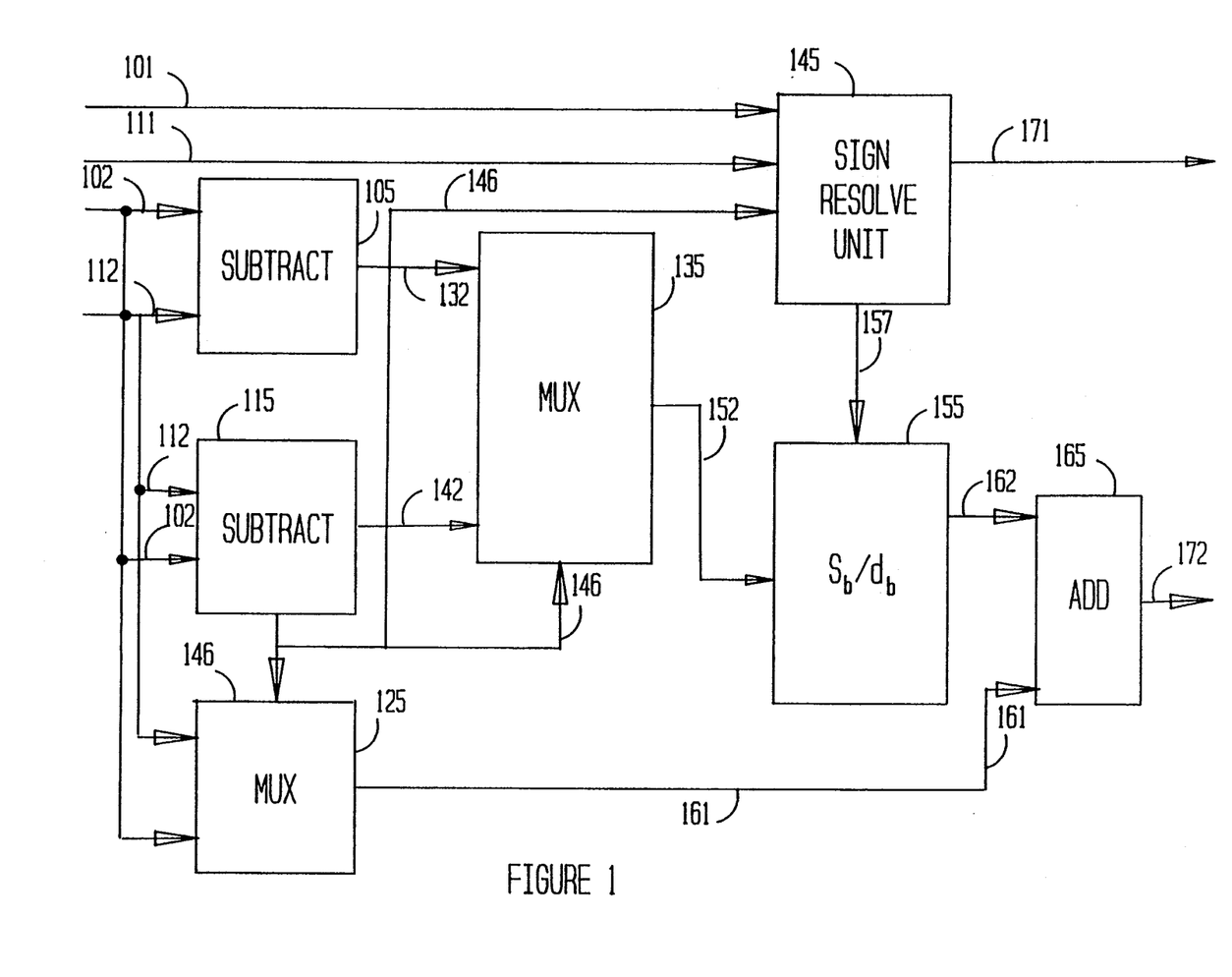
FIG. 1 is a block diagram of the prior art context in which the present invention is used.

Referring to FIG. 1, the context of the present invention is illustrated. The hardware shown in FIG. 1 is intended to compute the sum of two sign logarithm numbers. This computation may involve either finding the logarithm of the sum or the logarithm of the difference, depending on the signs of the numbers. Wire 101 sends the sign of the number A to the sign resolve unit 145, and Wire 111 sends the sign of the number B to the sign resolve unit 145. The sign resolve unit 145 produces two output signals: the resulting sign 171 and the $s_b/d_b$ selector signal 157. Bus 102 provides a fixed point representation of the logarithm of the absolute value of the number A, and bus 112 provides a fixed point representation of the logarithm of the absolute value of the number B. When the constant base, b, of the logarithms is two, the number of bits representing the integer portion of busses 102 and 112 is equivalent to the exponent of a floating point word, and the number of bits representing the fractional portion of busses 102 and 112 is roughly equivalent to the mantissa of a floating point word. When the base is other than two, those skilled in the art will recognize that the interpretation of busses 102 and 112 may be different but that the techniques of the present invention will produce appropriate results.

Buses 12 and 112 are connected to subtractors 105 and 115. The output of subtractor 105 on bus 132 is $\log_b(|A|)-\log_b(|B|)$, and the output of subtractor 115 on bus 142 is $-(\log_b(|A|)-\log_b(|B|))$, Subtractor 115 also has an output carry signal 146 which indicates if A is greater than B. signal 146 is input to sign resolve unit 145 so that output 171 will indicate the correct sign for subtraction, Multiplexer 135 uses signal 146 to select either input 132 or input 142. This insures that output 152 always has the same sign. Typically the prior art has been designed so that the output 152 is always negative, however it is possible for the designer to implement the present invention so that bus 152 is always positive. The value on bus 152 is provided as input to the $s_b/d_b$ approximating unit 155. The state of signal 157 determines whether approximating unit 155 computes $s_b$ or $d_b$. The resulting value is output on bus 162.

Multiplexer 125 is connected to busses 112 and 102. Multiplexer 125 is controlled by signal 146 so as to provide the smaller (or larger) of A and B as its output on bus 161. Busses 161 and 162 are used as inputs to adder 165. The output 172 of adder 165 represents an approximation of $\log_b(|A|+|B|)$ if signal 157 selected $s_b$, or an approximation of $\log_b||A|-|B||$ if signal 157 selected $d_b$.

Typical prior art implementations for approximation unit 155 have used a ROM or PLA with the inputs being the bits from bus 152, The problem of this prior art technique is that the precision of the result is reduced because of the limitations of the ROM or PLA.

Figure 2:
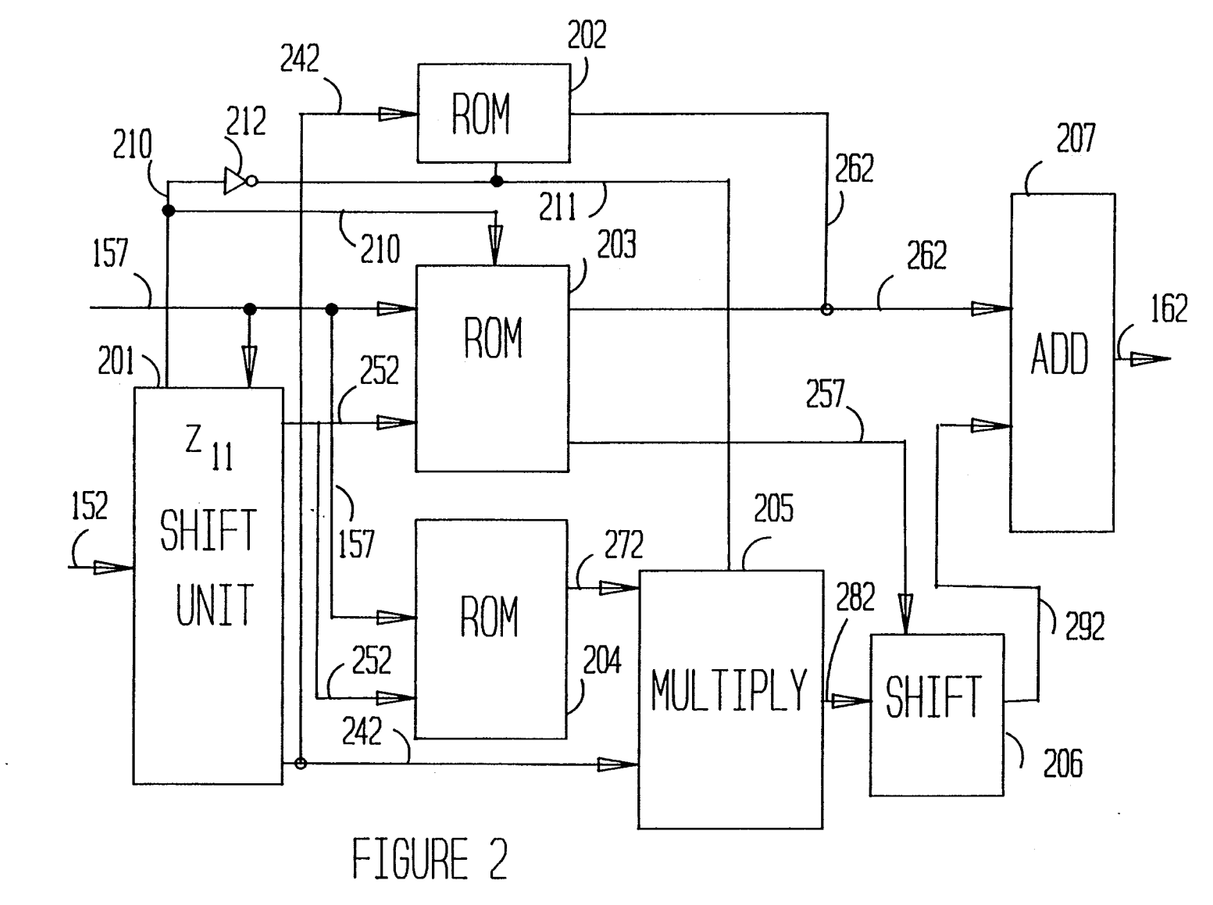
FIG. 2 is a block diagram of the present invention.

Referring to FIG. 2, the present invention receives the value on bus 152, which is connected to shift unit 201. Shift unit 201 varies its behavior according to signal 157. When signal 157 indicates $s_b$ is to be computed, shift unit 201 leaves the bits of bus 152 unchanged on its outputs. The high order n bits bus 152, referred to as $z_H$, are output unchanged on bus 252. The low order j bits of bus 152, referred to as $z_L$, are output unchanged on bus 242.

When signal 157 indicates $d_b$ is to be computed shift unit 201 provides very different output on busses 242 and 252. For the sake of discussion, assume that the present invention is implemented so that value on bus 152 is always positive. (If it is assumed that bus 152 is always negative, the modifications to shift unit 201 are obvious to those skilled in the art.) The shift unit 201 counts the number of bits with leading zeros in the value on bus 152. If the number of leading zeros is greater than or equal to zero and less than or equal to shift limit, typically $n-\text{int}(\log_2 n)$, the shifted high order $n-\text{int}(\log_2 n)$ bits of bus 152, are concatenated to the binary representation of the leading zero count. This concatenation of the leading zero count and the high bits, referred to as $z_H$, is output on bus 252. The next j bits of bus 152, referred to as $z_L$, are shifted corresponding to tile leading zero count, and output on bus 242.

The shift unit 201 also produces an enable control signal 210 which is true when $s_b$ is being computed (as indicated by signal 157) or is also true widen $d_b$ is being computed (as indicated by the opposite state of signal 157) and the leading zero count is less than or equal to the shift limit.

Bus 252, $z_H$, provides the low order n address inputs to ROMs 203 and 204. ROMS 203 and 204 accept n+1 address inputs, with the remaining address input on each ROM being connected to signal 157.

ROM 203 provides intercept points of the functions $s_b$ and $d_b$. The output 262 of ROM 203 is a value of $s_b$ or $d_b$ depending on the state of signal 157. The number of bits on bus 262 should be at least n+j. In the preferred embodiment, additional bit(s) from ROM 203 are output as a shift signal 257. The output of ROM 203 is enabled only when signal 210 is active.

ROM 204 provides slopes for lines used in linear interpolation of the functions $s_b$ and $d_b$. The output 272 of ROM 204 is a slope for either $s_b$ or $d_b$ depending on the state of signal 157.

Bus 242, $z_L$, provides j address inputs to ROM 202, which stores intercept points of the function $d_b(z)$ for values of z near zero. The alternative embodiment given below describes how ROM 202 may be omitted. Signal 210 is input to inverter 202, and its complement is output as signal 211. Signal 211 is the enable input of ROM 202, and so the output 262 of ROM 202 is enabled only when signal 210 is inactive. The output on bus 262 is either taken from ROM 202 when signal 210 is inactive or from ROM 203 when signal 210 is active. Those skilled in the art will realize a multiplexer could be used to accomplish the same effect. Also, it is obvious to those skilled in the art that the information stored in ROMs 202 and 203, or the information stored in ROMs 202, 203, and 204 could be stored in a single memory device, if access to such device is time multiplexed. Volatile memory such as dynamic RAM, could be used in place of ROM if a means for loading the memory is provided. Also, PLAs could be used in place of ROM. Furthermore, those skilled in the art could implement the present invention with different sized memories than described above. For example, the number of address bits for ROM 202 on bus 242 may be reduced by one bit for each additional bit of shifting allowed in shift unit 201. Although the above description describes how computation of $s_b$ and $d_b$ may be implemented as a single unit, those skilled in the art will recognize that the present invention may be implemented so as to compute $d_b$ in a separate unit. Such an implementation would have advantage for high speed operation, since the size of ROMs 203 and 204 would be cut in half.

At least j bits of bus 242 are provided as one input to fixed point multiplier 205. Those skilled in the art will realize that there are many commercially available high speed multipliers suitable for multiplier 205, for example, the TRW MPY16AJ. Also, those skilled in the art will realize a slower sequential multiply circuit is possible, as are ROM or RAM based quarter squaring circuits. The other input to multiplier 205 is the value on bus 272 from ROM 204. For reasonable accuracy, the number of bits on buses 272 and 282 should be about the same as on bus 242. Signal 211 is connected to multiplier 205. When signal 211 is active, multiplier 205 produces zero as its output on bus 282. When signal 211 is inactive, multiplier 205 produces the product of the fixed point values on bus 272 and bus 242. The product bus 282 output from multiplier 205 is connected to shift unit 206. Signal 257 (the control input of shift unit 206) indicates how many bit positions the bit pattern on bus 282 is to be shifted. The result is output on bus 292. Those skilled in the art will realize that signal 257 and shift unit 206 can be eliminated by pre-shifting the values in ROM 204 corresponding to the amount of shift that would otherwise be indicated by signal 257.

The value on bus 262 is provided as one of the inputs to adder 207. The other input to adder 207 comes from bus 292. Since bus 292 is not as wide as bus 262, the leftmost bits of the second input of adder 207 must be tied to ground (or $V_{CC}$, depending on logical requirements). The output 162 from adder 207 is an approximation of $s_b$ or $d_b$, depending on the state of signal 157.

Figure 3:
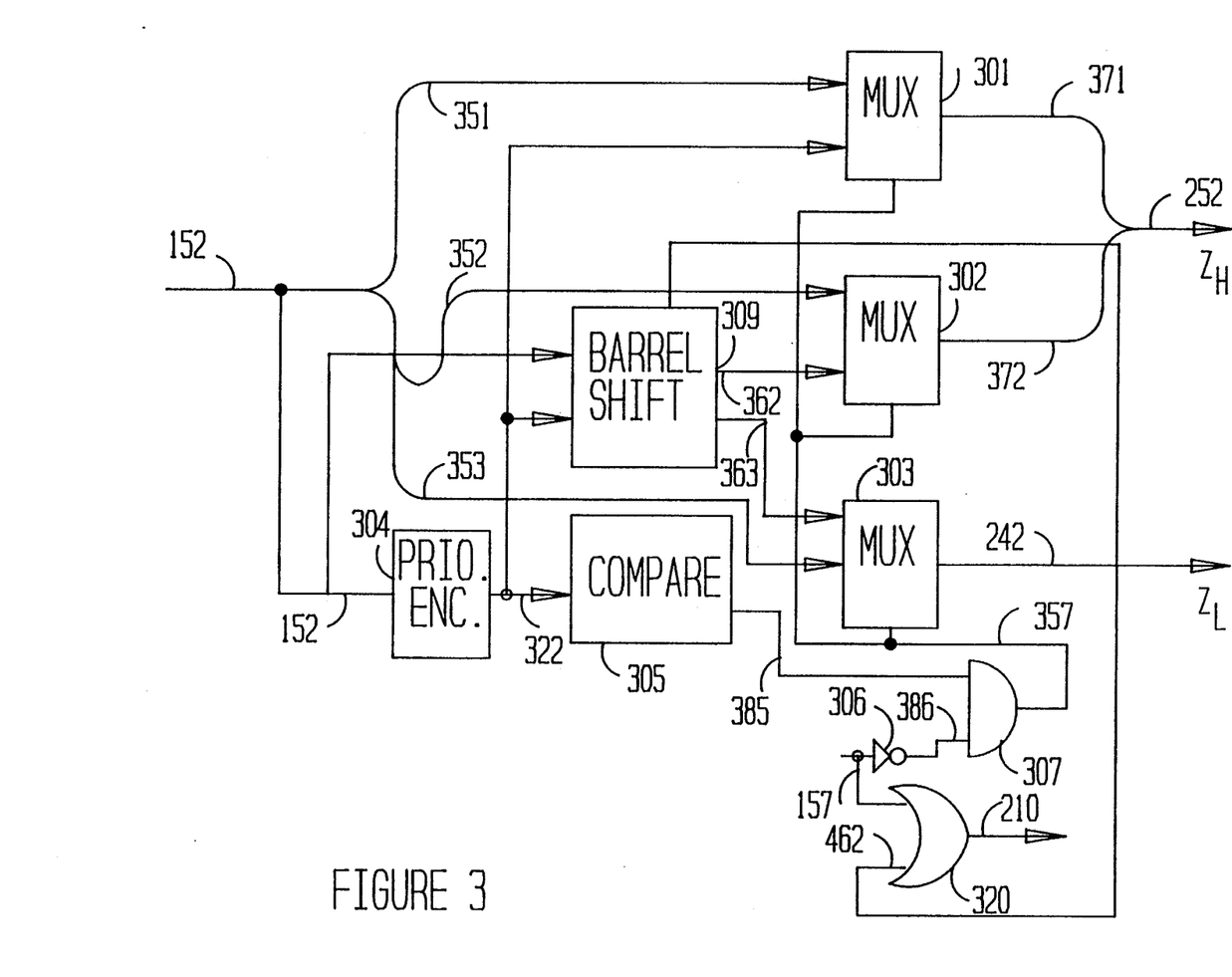
FIG. 3 is a circuit diagram of the shifting unit 201 used in the present invention.

Referring to FIGS. 2 and 3, the shift unit 201 receives an input value of at least n+j bits on bus 152. Bus 152 is provided as the input to priority encoder 304. The output 322 of priority encoder 304 is the count of leading zeros on bus 152. The leading zero count on bus 322 is input to comparator 305. If the value on bus 322 is less than or equal to than the shift limit, signal 385 is asserted.

Signal 385 is provided as input to AND gate 307. Signal 157 is provided as input to inverter 306, and its complement is provided as output on signal 386. Signal 386 is the other input to AND gate 307. The output of AND gate 307 on signal 357 indicates that $d_b$ is being computed and the leading zero count is less than or equal to the shift limit. Signal 357 is used to control multiplexers 301, 302, and 303.

Bus 152 is also split apart into three sub-busses 351, 352 and 353. Sub-bus 351, which is connected to the first input of multiplexer 301, is the high order int($\log_2 n$) bits of bus 152. Sub-bus 352, which is connected to the first input of multiplexer 302 is the next $n - \text{int}(\log_2 n)$ bits of bus 152. Sub-bus 353, which is connected to the first input of multiplexer 303, is the j remaining bits of bus 152. When signal 357 is inactive (indicating $s_b$ is being computed, or the leading zero count is greater than the shift limit) multiplexer 301 selects sub-bus 351 as its output on sub-bus 371, multiplexer 302 selects sub-bus 352 as its output on sub-bus 372, and multiplexer 303 selects sub-bus 353 as its output on bus 242.

The second input of multiplexer 301 is connected to bus 322. When signal 357 is active (indicating that $d_b$ is being computed and the leading zero count is less than or equal to the shift limit), multiplexer 301 selects the leading zero count, from bus 322, as its output on sub-bus 371.

Bus 152 is also provided as input to barrel shifter 309. Bus 322 is input to barrel shifter 309 to control the amount of left shifting that occurs. The number of places that the value from bus 152 is shifted left is one more than the value on bus 322. The high order bit of the shifted result from barrel shifter 309 is output as signal 462. The next $n - \text{int}(\log_2 n)$ bits of the shifted result from barrel shifter 309 are output on bus 362. The remaining j bits of the shifted result from barrel shifter 309 is output on 363.

When signal 357 is active (indicating that $d_b$ is being computed and the leading zero count is less than or equal to the shift limit), multiplexer 302 selects the shifted value from bus 362 as its output on sub-bus 372. Sub-bus 371 and 372 when taken together, form bus 252. Also, when signal 357 is active multiplexer 303 selects the shifted value from bus 363 as its output on bus 242.

High order bit 462 from barrel shifter 309 is one input to OR gate 320. The other input of OR gate 320 is signal 157. The output of OR gate 320 is signal 210. Since barrel shifter 309 shifts until the shift limit is reached or until the most significant bit is one, high order bit 462 indicates whether or not z is very close to zero. Signal 210 is asserted when $s_b$ is being computed (because the way $s_b$ is computed does not change if z is close to zero) or when z is not close to zero. Signal 210 is not asserted only when $d_b$ is being computed and z is close to zero.

Those skilled in the art will recognize that priority encoder 304, comparator 305, AND gate 307, OR gate 320, multiplexer 301, and inverters 306 and 212 could all be implemented in a single programmed logic array (PLA). Such an implementation would have the advantage of reduced chip count and increased speed. Also, those skilled in the art will recognize that multiplexers 302 and 303 could be eliminated if barrel shifter 309 allows a control input that prevents shifting and causes the input to be output unchanged. In such an instance, signal 357 (or its complement, depending on requirements of the barrel shifter) would be used as the control signal. Additionally, it is obvious to those skilled in the art that a circuit using a serial shift register could achieve the same effect as the circuit shown in FIG. 3.

ALTERNATIVE EMBODIMENT

There is an alternative embodiment of the present invention that allows elimination of ROM 202 from FIG. 2, while still computing $d_b(z)$ with the required accuracy for z near zero. An additional advantage of the alternative embodiment is that the memory requirements for ROM 203 and ROM 204 decrease when using the alternative embodiment. Those skilled in the art will realize that this alternative embodiment could be implemented in conjunction with the preferred embodiment so as to obtain the advantages stated above or separately from the preferred embodiment.

Figure 4:
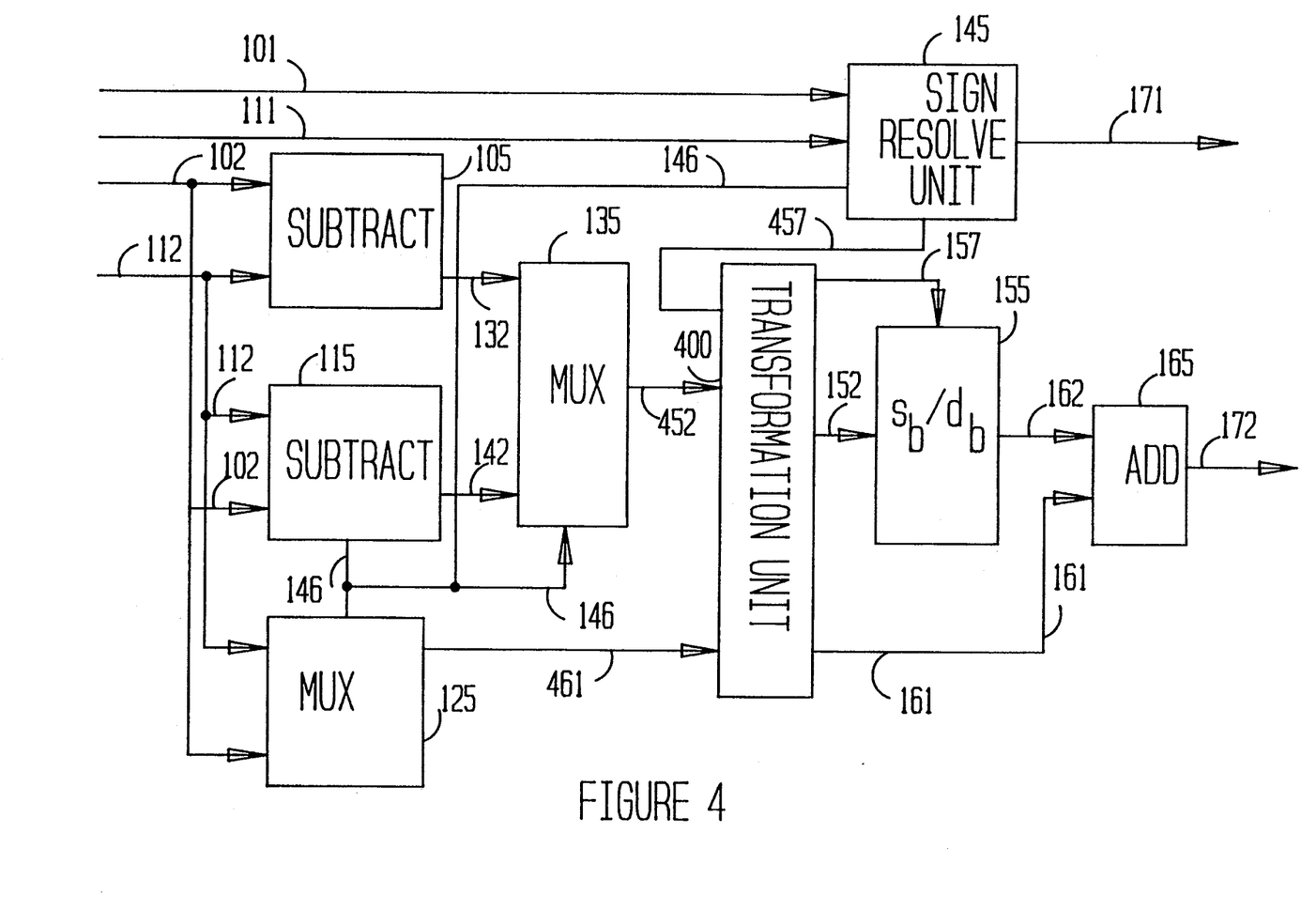
FIG. 4 is a block diagram of the context in which the alternative embodiment is used, including the transformation unit.

Referring to FIG. 4, the context of the alternative embodiment of the present invention is illustrated. The output of multiplexer 135 on bus 452 is $z = |\log_b(|A|) - \log_b(|B|)|$, the difference of the logarithms of the numbers to be added or subtracted. The multiplexer insures that z is positive. Those skilled in the art will recognize how to construct the alternative embodiment of the present invention under the assumption that the multiplexer insures that z is $-|\log_b(|A|) - \log_b(|B|)|$.

Sign resolve unit 145 provides signal 457, indicating whether $d_b$ or $s_b$ is to be computed. Multiplexer 125 provides the logarithm of the smaller of the numbers to be added or subtracted on bus 461. Those skilled in the art will recognize how to construct the present invention should one assume that multiplexer 125 provides the logarithm of the larger of the numbers being added or subtracted.

Signal 457, bus 452 and bus 461 are input to the transformation unit 400. When signal 457 indicates that $s_b$ is being computed, or when bus 452 has a value that is greater than or equal to a boundary value, G, the transformation unit 400 passes through the following unmodified signal 457 onto signal 157, bus 452 onto bus 152, and bus 461 onto bus 161. For a 32 bit word size, G should be no larger than 0.01812555, which insures that the required accuracy, 0.0000001719/z, will be maintained, Those skilled in the art will recognize the economy of choosing G to be the closest power of two ($2^{-6}$) that is less than 0.01812555.

When the value of z on bus 452 is less than G and bus 457 indicates that $d_b(z)$ is to be computed, the transformation unit 400 transforms the problem of computing $d_b(z)$ into one of computing $s_b$ of a transformed value on bus 152. In this situation, signal 157 indicates that $s_b$ will be computed, which is opposite of the indication given by signal 457. Also, in this situation, a transformed value is output on bus 161, rather than the original value on bus 461.

The value on bus 152 is provided as input to the $s_b/d_b$ approximating unit 155. The state of signal 157 (rather than signal 457) determines whether approximating unit 155 computes $s_b$ or $d_b$. Note that the operation of the transformation unit 400 insures that $d_b(z)$ is never computed when $z<G$. The resulting $s_b$ or $d_b$ value is output on bus 162. Busses 161 and 162 are used as inputs to adder 165. The output 172 of adder 165 represents an approximation of $\log_b(|A|+|B|)$ if signals 457 and 157 select $s_b$. The output 172 of adder 165 represents an approximation of $\log_b||A|-|B||$ when signal 457 selects $d_b$, regardless of whether signal 157 selects $d_b$ (for $z \geq G$) or whether signal 157 selects $s_b$ (for $z<G$).

Figure 5:
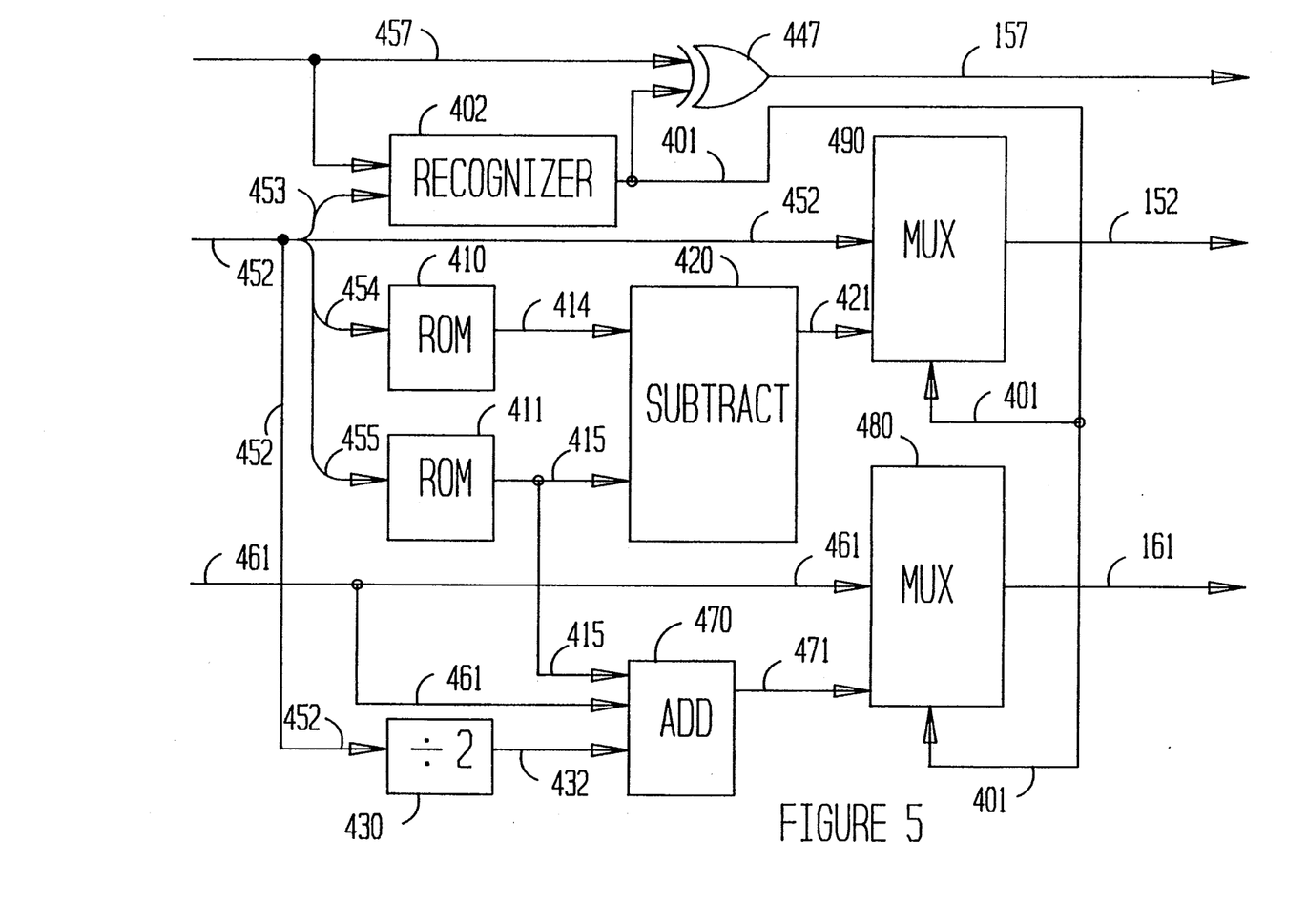
FIG. 5 is a circuit diagram of the transformation unit, which transforms the problem of computing $\log_b|1-b^z|$ into the easier problem of computing $\log_b(1+b^z)$.

Referring to FIGS. 4 and 5, the transformation unit 400 receives signal 457 and busses 452 and 461. Bus 452 is split into sub-busses 453, 454, and 455. Sub-bus 453 is connected to recognizer 402. Sub-bus 453 contains a portion of the high order bits of bus 452 sufficient for recognizer 402 to determine if $z<G$. Signal 457 is also connected to recognizer 402. When signal 457 indicates that $d_b$ is being computed, and sub-bus 453 indicates that $z<G$, recognizer 402 asserts signal 401. When signal 457 indicates that $s_b$ is being computed, or when sub-bus 453 indicates that $z \geq G$, recognizer 402 does not assert signal 401. If the preferred embodiment of FIG. 2 is implemented in conjunction with the alternative embodiment of FIGS. 4 and 5, the generation of signal 401 and 211 could be performed by a single hardware unit. On the other hand, if the alternative embodiment is implemented without the preferred embodiment, recognizer 402 is required to operate as described above.

Signals 401 and 457 are inputs to exclusive OR 447. The output 157 of exclusive OR 447 is identical to the input 457 when signal 401 is not asserted. The output 157 of exclusive OR 447 is the opposite of input 457 when signal 401 is asserted.

Signal 401 is connected to multiplexers 490 and 480. Bus 452 is connected as one input of multiplexer 490. When signal 401 is not ass multiplexer 490 uses the input from bus 452 unmodified as its output on bus 152.

Bus 461 connected as one input of multiplexer 480. When signal 401 is not asserted, multiplexer 480 uses the input from bus 461 unmodified as its output on bus 161.

Sub-bus 454 contains L bits from bus 452. Sub-bus 455 contains lessor significant bits. The number of bits in sub-bus 455 is assumed also to be equal to L, but those skilled in the art can modify the present invention to work when the number of bits in sub-bus 455 is not equal to L.

The position of the L bits of sub-bus 454 within bus 452 must be chosen such that for all possible values on bus 452 that are between G and G/2, the most significant bit always occurs within sub-bus 454.

Sub-bus 454 is connected as address input to ROM 410. Sub-bus 455 is connected as address input to ROM 411. Those skilled in the art will realize that ROM 410 and ROM 411 could be replaced with RAM, PLA or logic. Using the notation $x_1$ for the integer value of the address on sub-bus 454 and $x_2$ for the integer value of the address on sub-bus 455, when $x_1 \neq 0$, ROM 410 contains approximations for $$\log_b(x_1)+\log_b(G')-\log_b(2)*L-\log_b(\log_b(e)),$$

where G' is the least power of two greater than or equal to G. For a 32 bit wordsize, some of the reasonable values that might be selected for G' are $2^{-5}, 2^{-6}$ or $2^{-7}$. In the case $x_1=0$, ROM 410 contains a significantly negative (but finite) number such as $-64$. The value looked up from ROM 410 is output on bus 414. The above definition of G' assumes binary arithmetic is used to implement the present invention. Those skilled in the art will recognize that if another radix is used for arithmetic, G' would be defined to be the least power of that radix that is greater than or equal to G, and that $\log_b(R)*L$ would replace $\log_b(2)*L$, where L would indicate the number of digits for $x_1$ and $x_2$ represented using that radix. The radix used for arithmetic is unrelated to the base, b, of the logarithms.

When $x_2 \neq 0$, ROM 411 contains approximations for $$\log_b(x_2)+\log_b(G')-2*\log_b(2)*L-\log_b(\log_b(e)).$$

In the case $x_2=0$, ROM 411 contains a negative (but finite) number such as $-64-\log_b(2)*L$. The value looked up from ROM 411 is output on bus 415. The number of bits and the radix point positions for busses 414 and 415 are similar to that of bus 452. Note that the memory requirements of ROMs 410 and 411 in this alternative embodiment are significantly smaller than the memory requirements of ROM 202 in the preferred embodiment. Those skilled in the art will recognize that the contents of ROMs 410 and 411 could be simplified to be $\log_b(x_1)$ and $\log_b(x_2)$ when additional hardware is provided to produce $$\log_b(x_1)+\log_b(2)*L-\log_b(x_2)$$

on bus 421 and $$\log_b(x_2)+\log_b(G')-2*\log_b(2)*L-\log_b(\log_b(e))$$

on bus 415. Those skilled in the art will recognize that $\log_b(x_1)$ and $\log_b(x_2)$ could be obtained from a single table. Also those skilled in the art will recognize that if the preferred and alternative embodiments were being implemented in a single unit and memory access were time multiplexed, it would be possible to combine ROMs 203, 204, 410, and 411 together. Those skilled in the art will recognize that if sub-bus 454, which outputs $x_1$, is $L_1$ bits wide, and sub-bus 455, which outputs $x_2$, is $L_2$ bits wide, then $$\log_b(x_1) + \log_b(2) * L_2 - \log_b(x_2)$$

should be the output on bus 421 and $$\log_b(x_2) + \log_b(G') - \log_b(2) * L_1 - \log_b(2) * L_2 - \log_b(\log_b(e))$$

should be output on bus 415.

Busses 414 and 415 are connected as inputs to a fixed point subtractor 420. Bus 414 is the minuend and bus 415 is the subtrahend. Subtractor 420 produces bus 414 minus bus 415 as its result on bus 421.

Bus 421 is connected to the other input of multiplexer 490. When signal 401 is asserted, multiplexer 490 uses the input from bus 421 as its output on bus 152. If the output on bus 421 is negative when signal 401 is asserted, the output on bus 152 will be negative. If approximation unit 155 is capable of processing a negative input on bus 152, the result on bus 162 will be correct. On the other hand, those skilled in the art will recognize the economy of restricting approximation unit 155 to processing only positive values. Those skilled in the art will recognize the details of how to modify the present invention so that when signal 401 is asserted and sub-bus 454 indicates that $x_1 = 0$ (which is the only condition that would cause a negative value on bus 152), a modified version of approximation unit 155 would be disabled, and bus 162 outputs zero.

If the output on bus 421 is a large positive value when signal 401 is asserted, the output on bus 152 is also large. If approximation unit 155 is capable of processing large positive values on bus 152, the result on bus 162 would be correct. On the other hand, those skilled in the art will recognize the economy of restricting approximation unit 155 to processing only small positive values. Those skilled in the art will recognize details of how to modify the present invention so that 401 is asserted and sub-bus 455 indicates that $x_2 = 0$ (which is the only condition that would cause a large positive value on bus 152), a modified version of subtractor 420 passes the value on bus 414 onto bus 421 (which multiplexer 490 passes onto bus 152) and a modified approximation unit 155 passes this value from bus 152 onto bus 162.

Bus connected to divide by two unit 430. The result from unit us 432 is connected to one input of adder 470. Bus 432 has a value which is one half of the value on bus 452. Those skilled in the art will realize this can be accomplished without unit 430 by shifting bus 452 one position to the right before connecting it to adder 470.

Bus 415 and bus 461 are also connected as inputs to adder 470. Adder 470 produces the sum of the values on busses 415, 461 and 432 as its output on bus 471. Bus 471 is connected to the other input of multiplexer 480. When signal 401 is asserted, multiplexer 480 uses the input from bus 471 as its output on bus 161.

What is claimed is:

1. In a computer system for computing the sums and differences of real numbers represented as logarithmic values, said system having a first subtractor means for computing the difference, z, of said logarithmic values, a means for computing $d_b(z) = \log_b|1 - b^z|$ and $s_b(z) = \log_b(1 + b^z)$, selection means for selecting one of said logarithmic values as a selected logarithm, and first adder means for producing the sum of said selected logarithm and said $d_b(z)$ value when a subtraction signal is asserted, and for producing the sum of said selected logarithm and said $s_b(z)$ value when said subtraction signal is not asserted, said means for computing comprising:

transformation means, coupled to said first subtractor means, operative for converting said z to a transformed z value and for converting said selected logarithm to a transformed selected logarithm when both said subtraction signal is asserted and said z is less than G, for passing said z as said transformed z value and for passing said selected logarithm as said transformed selected logarithm when said subtraction signal is not asserted or said z is greater than or equal to said G, for asserting a modified subtraction signal when both said subtraction signal is asserted and said z is greater or equal to said G, and for unasserting said modified subtraction signal when said subtraction signal is not asserted or when said z is less than said G;

normalization means, coupled to said transformation means, operative for producing a shifted z value when said modified subtraction signal is asserted by left shifting said transformed z value until the most significant bit is 1 or until a shift limit is reached, and for outputting the more significant part of said shifted z value excluding said most significant bit, the least significant part of said shifted z value, and a shift count proportional to the number of bit positions shifted when said modified subtraction signal is asserted, and for outputting the unmodified more significant bits of said transformed z value on the same bus as said shift count and said more significant part, and the unmodified least significant bits of said transformed z value on the same bus as said least significant part when said modified subtraction signal is not asserted;

first memory means, coupled to said normalization means and to said transformation means, operative for receiving said more significant part, said shift count and said modified subtraction signal, and for using said more significant part, said shift count, and said modified subtraction signal as an address, and in response, for outputting an intercept value;

second memory means, coupled to said normalization means and to said transformation means, operative for receiving said more significant part, said shift count and said modified subtraction signal, and for using said more significant part, said shift count, and said modified subtraction signal as an address, and in response, for outputting a slope value;

multiplication means, coupled to said normalization means and to said memory means, operative for receiving said least significant part and said slope value, and in response for outputting a product;

second adder means, coupled to said first memory means and to said multiplication means, operative for computing the sum of said intercept value and said product; and said first adder means coupled to said second adder means and to said transformation means, operative for adding said transformed selected logarithm and said sum of said intercept value and said product, thereby adding said selected logarithm to said $s_b(z)$ value when said subtraction signal is not asserted, thereby adding said selected logarithm to said $d_b(z)$ value when said subtraction signal is asserted and said z is greater than or equal to said G, and thereby adding said transformed selected logarithm to the value of $s_b$ of said transformed z when said subtraction signal is asserted and said z is less than said G.

2. The computer system of claim 1 wherein said transformation means further comprises:

third memory means, coupled to first subtractor means, operative for receiving said z value, and for using some more significant bits of said z as an address, and in response, for outputting a first value;

fourth memory means, coupled to said first subtractor means, operative for receiving said z value, and for using some lessor significant bits of said z as an address, and in response, for outputting a second value;

second subtractor means, coupled to said third memory means and to said fourth memory means, operative for subtracting said second value from said first value, and in response, for outputting said transformed z; and third adder means, coupled to said fourth memory means, said first subtractor means, and said selection means, operative for adding said second value, said selected logarithm, and one half of said z value, to form said transformed selected logarithm.

3. The computer system of claim 1 wherein said normalization means further comprises:

priority encoder means, coupled to said first subtractor means, operative for receiving said transformed z value, and in response for counting the number of leading zeros in said transformed z value, and for producing said shift count;

comparator means, coupled to said priority encoder means, operative for comparing said shift count against said shift limit, and in response for producing a modified shift count equal to zero when a logarithmic sum is to be computed, for producing said modified shift count equal to said shift limit when a logarithmic difference is to be computed and said shift count is beyond said shift limit, and for producing said said modified shift count equal to said shift count when a logarithmic difference is to be computed and said shift count is less than or equal to said shift limit; and barrel shifter means, coupled to said comparator means and to said first subtractor means, operative for shifting said transformed z value corresponding to one plus said modified shift count.

\* \* \* \* \*